United States Patent [19]

Brown et al.

[11] Patent Number: 5,668,875
[45] Date of Patent: Sep. 16, 1997

[54] METHOD AND APPARATUS FOR AUTHENTICATION IN A COMMUNICATION SYSTEM

[75] Inventors: Daniel Peter Brown, Elmhurst; Louis David Finkelstein, Wheeling, both of Ill.

[73] Assignee: Motorola, Inc., Schaumburg, Ill.

[21] Appl. No.: 683,590

[22] Filed: Jul. 15, 1996

Related U.S. Application Data

[63] Continuation of Ser. No. 282,832, Jul. 29, 1994, Pat. No. 5,537,474.

[51] Int. Cl.$^6$ ........................................ H04Q 7/38
[52] U.S. Cl. .............................. 380/23; 455/411
[58] Field of Search .................. 380/23; 455/54.2; 379/62

[56] References Cited

U.S. PATENT DOCUMENTS

5,537,474  7/1996  Brown et al. ........................ 380/23

*Primary Examiner*—Gilberto Barrón, Jr.
*Attorney, Agent, or Firm*—Raymond J. Warren

[57] ABSTRACT

A method and apparatus for authenticating a roaming subscriber. In a preferred embodiment, a subscriber receives a challenge that is in a format of a local authentication protocol, and determines whether the local authentication protocol is the subscriber's home system authentication protocol. If it is not, the subscriber converts the challenge into a format (e.g., bit length) compatible with its home system authentication protocol, and processes the converted challenge with the subscriber's secret key and authentication algorithm into an authentication response. The authentication response is converted to be compatible with the local authentication protocol, and transmitted to a local system communication unit. The challenge and response is then forwarded to the subscriber's home system for similar conversion and processing, and subscriber's response is compared against a home system generated response.

6 Claims, 9 Drawing Sheets

METHOD AND APPARATUS FOR AUTHENTICATION IN A COMMUNICATION SYSTEM

This is a continuation of application Ser. No. 08/282,832, filed on Jul. 29, 1994 now U.S. Pat. No. 5,537,474.

FIELD OF THE INVENTION

The present invention relates to communication systems and, more particularly, to authentication and encryption within communication systems.

BACKGROUND OF THE INVENTION

Many communication systems currently use authentication and encryption to enhance security of the systems. These communication systems include cellular radiotelephone communication systems, personal communication systems, paging systems, as well as wireline and wireless data networks. A cellular communication system will be described below by way of example; however, it will be appreciated by those skilled in the art that authentication and encryption techniques described can be readily extended to other communication systems.

Turning to the cellular communication systems, these systems typically include subscriber units (such as mobile or portable units) which communicate with a fixed network communication unit via radio frequency (RF) communication links. A typical cellular communication system includes at least one base station and a switching center. The switching center that a subscriber unit accesses may not be his "home" switching center. In this case, the subscriber unit is termed a roaming subscriber unit. The switching center which the subscriber unit accesses (termed the "visited" switching center) must communicate with his "home" switching center via the public switched telephone network (PSTN) or other type of connection, such as a satellite link, to retrieve information about the subscriber unit and provide service billing information back to the "home" switching center.

One responsibility of the fixed network communication unit (such as a switching center, location register or authentication center) is to grant use of the communication system to the subscriber unit after the requesting subscriber unit meets the authentication requirements of the system. In a typical cellular telephone communication system, each subscriber unit is assigned a mobile subscriber identifier (MSI), which uniquely identifies the subscriber unit from other subscriber units. In the European cellular communication system, GSM (Global System for Mobile Communications), one such identifier is the international mobile sub'scriber identification number (IMSI). In order to protect the privacy of the IMSI, GSM calls for most subscriber-fixed network communications to use a temporary mobile subscriber identifier (TMSI) in lieu of the IMSI. In the U.S., EIA-553§2.3 specifies that each subscriber shall have a mobile identification number (MIN) and a factory set electronic serial number (ESN). For convenience all such and similar identifiers will be referred to by the term MSI below.

Detection of a legitimate subscriber's MSI may be accomplished by RF eavesdropping or by purposeful or inadvertent divulgenee of the MSI by the radiotelephone installer. Although the IMSI is more protected than the MIN/ESN combination from inadvertent divulgenee, the IMSI remains similarly vulnerable to acquisition during RF eavesdropping. Under either protocol, once the subscriber's MSI is known (stolen), a thief may reprogram another subscriber unit with the stolen MSI causing two or more subscriber units to have the same MSI. While cellular radiotelephone systems have authentication procedures to deny access to subscribers not having legitimate MSIs, most typically lack effective capability for detecting multiple users or to minimize the effect of installer leaked MSIs. As a consequence, legitimate users may be billed for both a thief's use of his MSI as well as their own usage.

Because of this problem with illegitimate subscribers (clones) and other forms of fraudulent access, several authentication protocols have been devised. In GSM the fixed network communication unit initiates the authentication process following receipt of a TMSI from the subscriber by generating and sending a challenge (a random or pseudo-random number or RAND) to the subscriber. The subscriber is required to retrieve at least two enciphering elements from its memory: a predetermined ciphering algorithm (e.g., A38) and the subscriber's authentication secret key (Ki). The subscriber then mixes (enciphers) the RAND and Ki into a signed response (SRES) and transmits this signed response back to the fixed network communication unit. If the received SRES matches with the network generated SRES (using the same algorithm and the subscriber's Ki stored in the network), the subscriber is authenticated for service.

In the USA, the United States Digital Cellular (USDC) and CDMA (Code Division Multiple Access) standards are known as IS54 and IS-95, with an interworking protocol known as IS-41 (all published by the Electronic Industries Association (EIA), 2001 Eye Street, NW, Washington, D.C. 20006). These use the same basic authentication protocol utilizing a series of specialized messages which must be passed between the subscriber and a communication unit of the network before system access is granted. However, the IS-54/95 protocols employ a "global challenge" of 32 bits in length, as compared with the 128 bit RAND used in GSM. When this challenge is mixed (or encrypted) together with a shared secret key (the $SSD_A$), the result is an 18 bit signed response (AUTH_R) (contrasting with the 32 bit SRES in GSM). Further processing, using the same algorithm and additional shared secret data ($SSD_B$) or using a different algorithm, is used to generate the message encryption algorithm key and voice privacy mask.

A fundamental problem with having these significantly different authentication protocols is that there is no effective way to provide for "seamless" roaming for subscribers across air interface boundaries. This means that to provide for dual air interface phones, under known methods the subscriber would be required to additionally maintain dual identifiers (and dual accounts) and secret keys for each of the protocols used in the two systems. Even where the subscriber possessed a smart card or detachable subscriber identity module (SIM) capable of use in handsets of different systems, the user would still be required to maintain dual identifiers and have the equivalent of two SIMs and dual registrations for each smart card.

The concept of universal personal mobility has emerged as an important feature of advanced communications networks. However, such universal personal mobility will only be achieved when a user can be readily authenticated even in visited systems employing authentication protocols differing from those of his home system. Therefore, a need exists for a privacy and authentication technique which can alleviate these problems and allow for user roaming across system boundaries.

DETAILED DESCRIPTION

Figure 8:
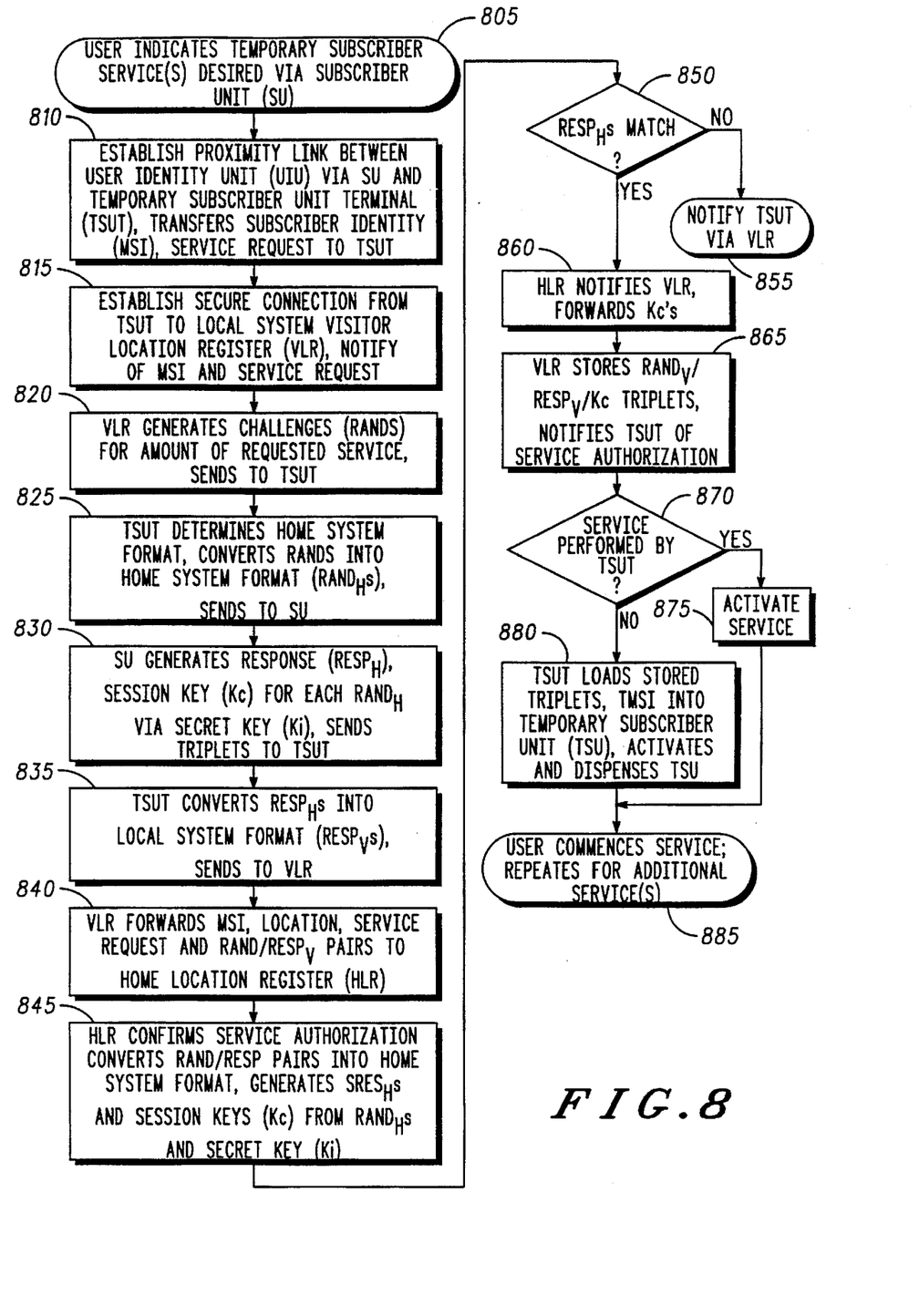
FIGS. 8 and 9 are flowcharts of an authentication process in accordance with a fourth embodiment of the invention.
Figure 9:
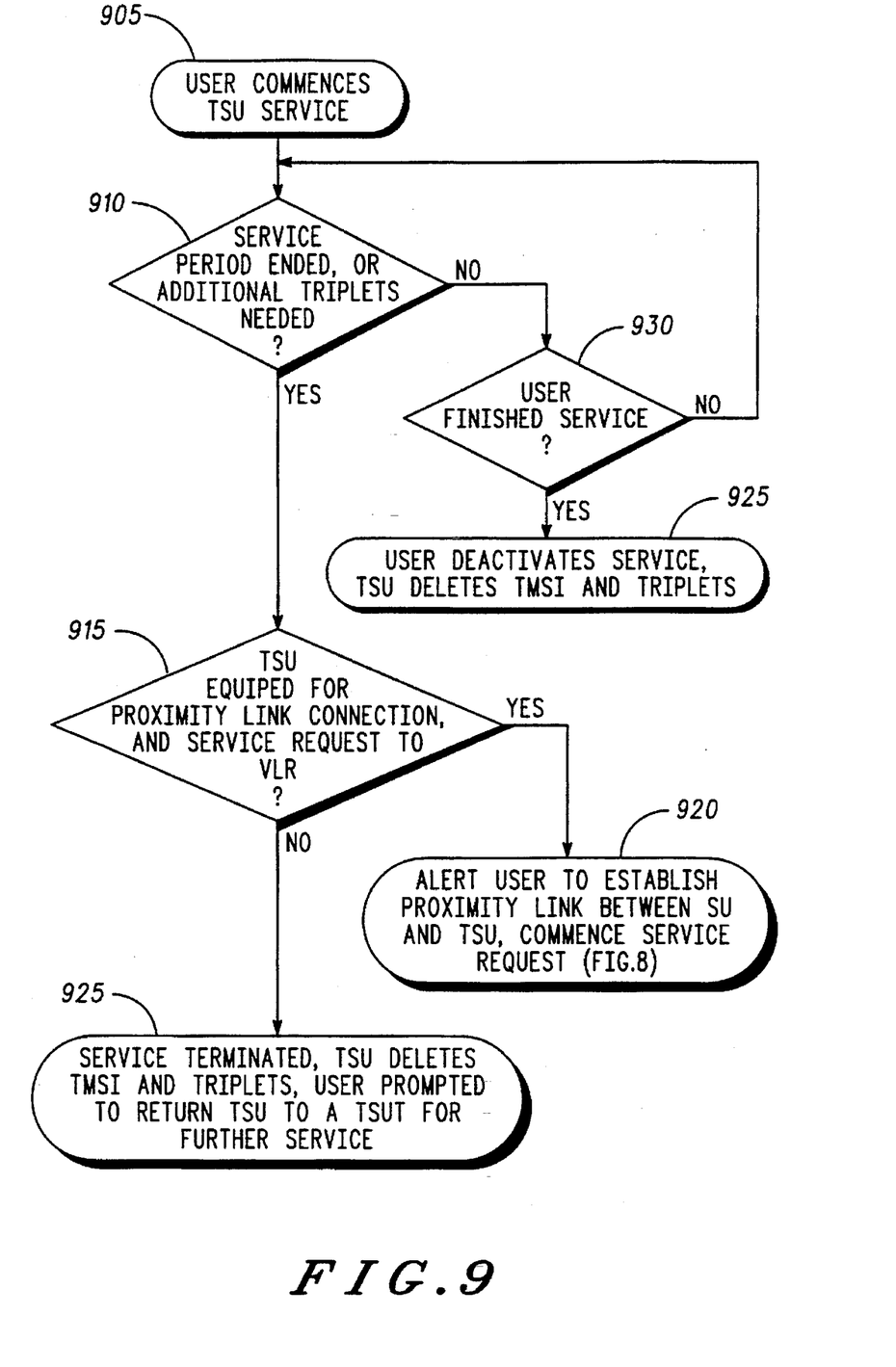

These needs for providing authenticated roaming across system boundaries are met through provision of a method and apparatus for authentication of the subscriber with his own system even when located in a visited system. This authentication is accomplished, in an illustrative embodiment of the invention, by first providing the subscriber with a subscriber identification unit (SIU) containing a subscriber identifier (MSI) and secret key (e.g., an A-key, Ki or the like). A processor is also provided, either in the subscriber unit or (in the case of embodiments such as described in connection with FIGS. 8 and 9 below) in fixed units, providing a necessary conversion between the home system authentication formats and the visited system authentication formats. An interworking function is also provided connecting the various systems, typically connected as an adjunct or part of a location register or switching center.

Figure 1:
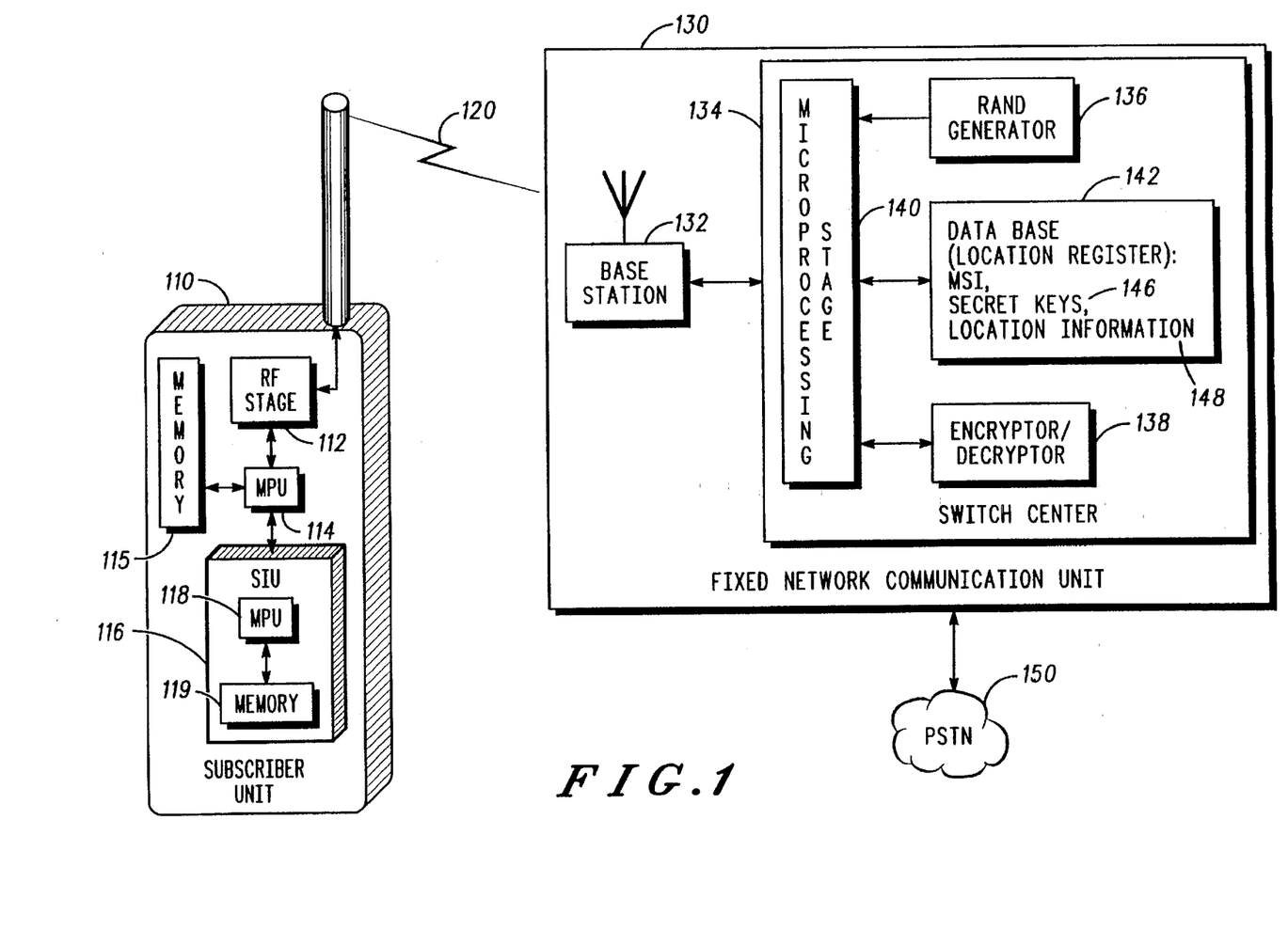
FIG. 1 is a block diagram showing a first embodiment of a communication system having a subscriber unit in a fixed network communication unit in accordance with the present invention.

FIG. 1 generally depicts a subscriber communication unit 110 such as a cellular subscriber telephone and a fixed network communication unit 130, such as a cellular telephone base site and switching center. The subscriber unit 110 is generally depicted showing its RF stage 112 for receiving and transmitting RF signals, a microprocessing stage 114 connected to the RF stage and also connected to a memory 115. In addition the subscriber unit 110 is illustrated with an embedded subscriber identification unit (SIU) 116 generally illustrated including a microprocessing unit 118 and a memory 119. The SIU may be a detachable module such as the subscriber identity module (SIM) found in GSM phones. In accordance with the GSM protocol, such an SIU would have embedded within it both the subscriber identifier (IMSI) and secret key (Ki), as well as appropriate authentication and key agreement algorithms (A3 and A8; A5 resides in subscriber unit 110) to perform the security functions desired for the subscriber unit. In this respect the SIM is a smart card. It should be understood that while the subscriber unit 110 is illustrated having the SIU 116 embedded therein, various embodiments of the invention described below will show use of an SIU, such as a smart card, in arrangements where it cannot be permanently integrated within a subscriber unit. Further, it is possible for the functions of the SIU to be carried out within an appropriately structured subscriber unit using the memory 115 and processor 114 of the subscriber unit 110, as long as the unit is appropriately equipped with additional circuitry for communicating the security information, such as is discussed further in connection with FIG. 6 below. One skilled in the art will thus recognize that while there are a variety of ways by which the user's security information (e.g. identifier and secret key) can be maintained and accessed for authentication and privacy functions, the descriptions here and of the SIU only represent the presently preferred embodiment in connection with the cellular radiotelephone system. Additional elements which may be accessed by the microprocessing stage 114 of the subscriber unit 110 may include data input stages such as key entry pads or voice microphones, optional feature items, and in USDC a random number generator (for generating random challenges from the subscriber unit) and appropriate encryption/decryption circuitry.

In the current USDC phones not making provision for a smart card/SIU, the subscriber identifier (MSI, which may include the mobile identification number (MIN) and electronic serial number (ESN)) will reside in a nonvolatile memory. A 64 bit secret key called the "A-key" also resides in this memory. This A-key is also maintained in the home location register (HLR) for the subscriber in its home system. In order to minimize the need for inter network traffic while also maintaining the A-key as a secret key between the subscriber and the HLR alone, IS-54/95 provide for a temporary shared secret data key (SSD) for use in authentication and encryption. This SSD key is generated based on the input of a 56 bit challenge received along with a "change SSD" command and the A-key. Although the A-key is not shared, upon computation of the SSD the home system HLR will generally share the SSD with other requesting location registers (known as "visitors location registers" (VLRs)).

The next time an authentication event occurs, such as a registration attempt of the mobile subscriber unit within a service region, the serving system issues a 32 bit random challenge (RAND) on the global overhead channel. This RAND is input together with the SSD in a common algorithm used throughout the system to generate an 18 bit authentication response (AUTH_R). If the subscriber is in a visited system, the AUTH_R calculated in the subscriber is communicated via the fixed network communication unit 130 of the visited system to the home system HLR, together with the RAND. The HLR then performs its own calculation of AUTH_R using the RAND and the known SSD for the subscriber. If the AUTH_R provided by the subscriber is correct, the tiome system generally, and in a preferred embodiment, provides the SSD to the visited system, along with other user data, in order that the visited system can perform future authentications without the need for further interactions with the home-network. Autonomous authentication by the visited network is then possible through the use of this shared SSD and the common authentication algorithm. In addition to the initial calling request, authentication may occur, e.g., upon the invocation of special calling services, upon the occurrence of a predetermined period of traffic communication, or upon events such as a request for a subscriber terminated call. In addition to providing for further authentication, the SSD is also used in determining an appropriate message encryption algorithm key arid voice privacy mask.

Figure 2:
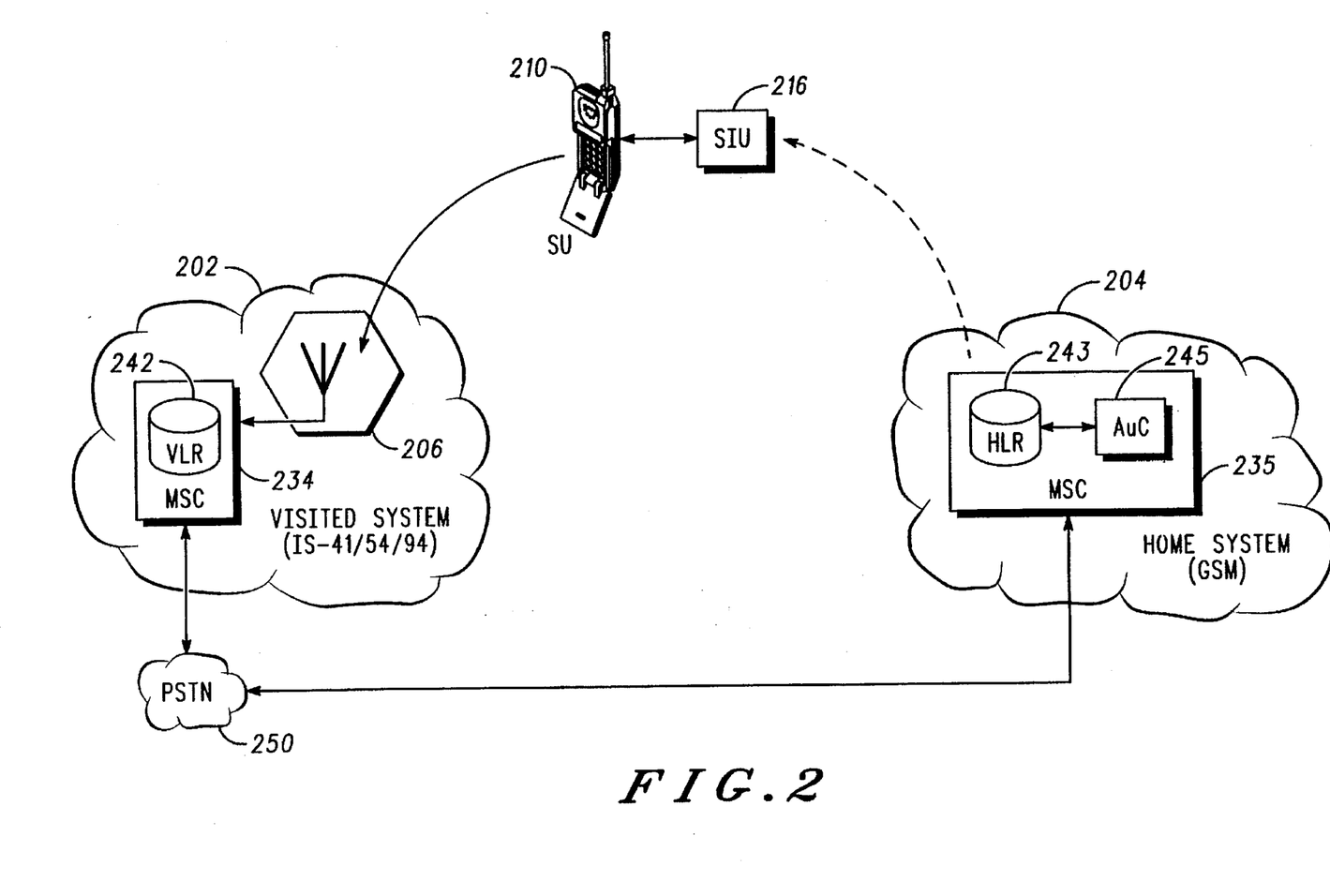
FIG. 2 is a diagram depicting a subscriber roaming between systems in accordance with the present invention.
Figure 3:
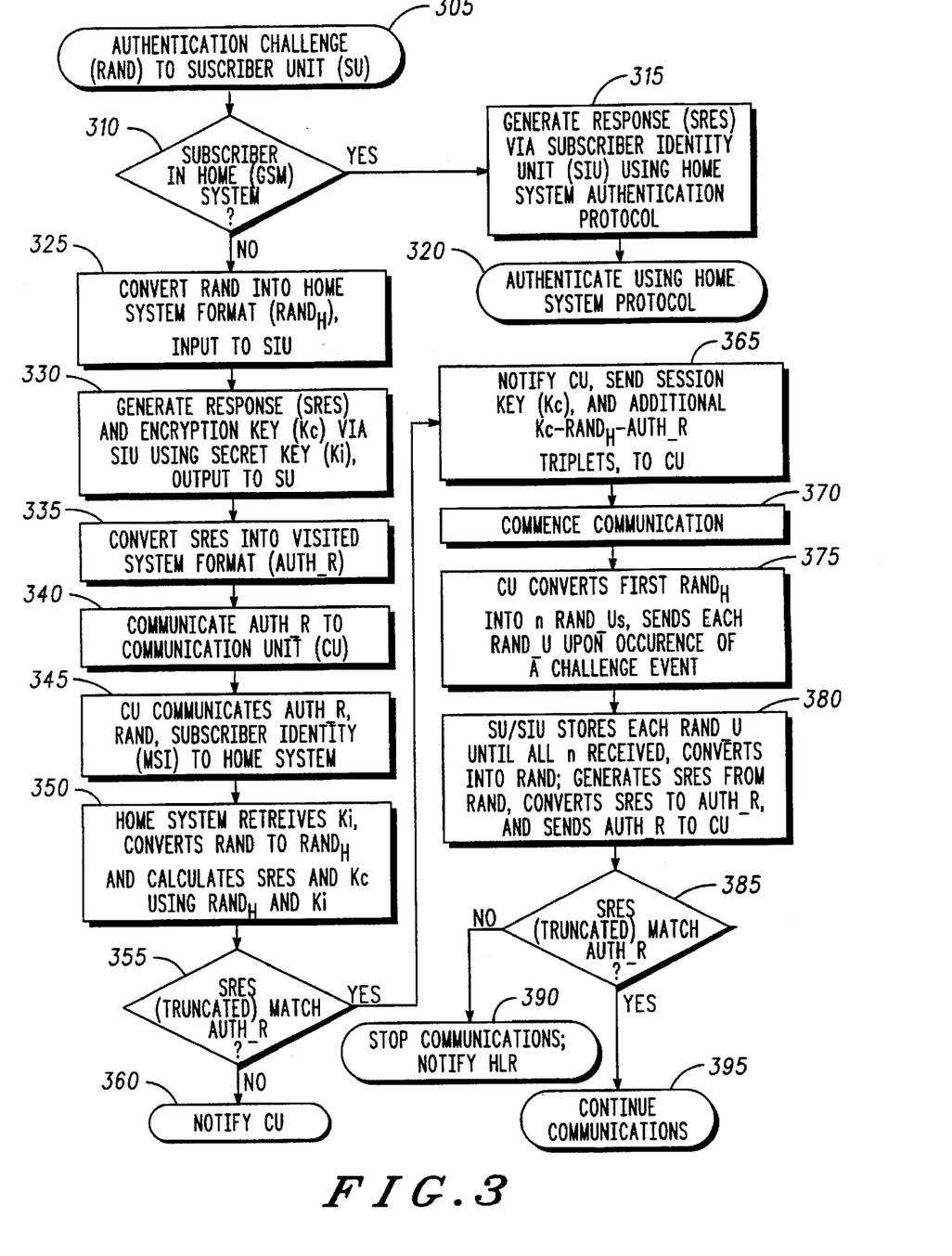
FIG. 3 is a flowchart of an authentication process used in accordance with a first embodiment of the invention.

Returning to FIG. 1, a fixed network communication unit 130 is generally depicted including a switch center (MSC) 134 having a processor stage 140, a database or location register 142, a RAND generator 136 and encrypter/decrypter 138. Where the location register 142 is a VLR, the secret key 146 stored there would be the SSD, along with any generated crypto key or voice privacy mask. In order to maintain the privacy of the A-key, this secret key 146 is only stored in the home location register (HLR) of the subscriber, along with MSI 144 and location information 148 regarding the subscriber's last registered location. The RAND generator 136 is used in generating the challenges, which are typically generated at the switch center 134 connected with the serving base station 132 in communication with the subscriber unit 110. The fixed network communication unit 130 is in turn connected with a public switch telephone network (PSTN) 150. The PSTN link can be used for connecting circuit switched calls to fixed end systems, as well as to link VLRs to HLRs as may be required for authentication and billing of roaming subscribers. While the above described IS-54/95 approach towards authentication allows for limited roaming within a system using a USDC protocol, there is at present no process by which a subscriber roaming out of his home system can still be authenticated in a system using a different authentication protocol. Turning now to FIGS. 2 and 3, a solution to this problem is illustrated in a first embodiment of the invention. In FIG. 2, a dual air interface subscriber unit (SU) 210 is shown roaming out of its home system, a GSM system, into a visited system, one complying with USDC or CDMA standards (IS-54/95). This subscriber is also carrying a subscriber identification unit (SIU) 216 for use in the subscriber unit 210, similar to those illustrated in subscriber unit 110 and SIU 116 of FIG. 1. In accordance with GSM standards, SIU 216 would typically be a SIM or smart card attachable to subscriber unit 210. Because subscriber unit 210 is a dual air interface phone, its RF stages and microprocessor stages are equipped to operate in systems using different air interfaces. By virtue of the present invention, subscriber unit 210 is also able to be authenticated in the different systems. In the particular embodiment of FIG. 3, the subscriber unit 210 is equipped to carry out the necessary conversions for authentication. Thus, the SIU 216 may simply be a standard GSM SIM card, requiring no further processing than would be expected within a standard GSM system.

As alluded to before, the GSM authentication protocol differs significantly from that of a typical USDC authentication protocol described above. In GSM each SIU, or SIM, is programmed with the subscriber's unique "international mobile subscriber identity" (IMSI) and a 128 bit secret key, Ki. This IMSI and Ki are also retained in the HLR of the home system. In a typical GSM switching center 235, the actual storage location for the IMSI and Ki is an authentication center (AuC) 245 (a processor and database) connected to the HLR 243. When in its home system, and if subscriber unit 210 is in a service region served by its home location register, upon registration the HLR/AuC 243, 245 will generate a 128 bit challenge (RAND) and communicate this to the subscriber unit. At the same time, the HLR/AuC 243, 245 will calculate a 32 bit signed response (SRES) using the RAND and secret key Ki in a mixing algorithm (A3). A session key, or secret encryption key (Kc) is also calculated using a separate algorithm (A8). At the same time the SIU 216 in subscriber unit 210 calculates SRES and Kc using the received RAND and stored Ki. SRES is then transmitted back from the subscriber unit 210 and forwarded to HLR/AuC 243, 245 for comparison with its internally calculated SRES. If there is a match, Kc is stored as an encryption variable and service is allowed to proceed. When roaming within the home system, the fixed network protocol is varied to allow for the fact that Ki is not shared with VLRs. Thus, upon registration of the subscriber unit 210, a request will be sent to the HLR for an appropriate number of triplet sets, each set consisting of a RAND, SRES, and Kc. Upon receipt, the VLR will then issue the challenge RAND, compare the response SRES, and if there is a match begin service using Kc as an encryption key.

The present invention allows for authentication across boundaries for systems like GSM and IS-54/95, while still leaving unchanged the air interfaces and authentication protocols used when a subscriber unit is operating within its home system. This is accomplished within the embodiments of FIGS. 2 and 3, by beginning with the issuance of a RAND at the serving communication unit 234 of the visited system 202. This is in keeping with the usage within a USDC type system, where a global challenge (RAND) is already being communicated to subscriber units entering a given cell coverage area 206 (step 305).

Upon recognition that this subscriber unit is in a visited system (step 310) (recognized, for example, by predetermined selection by the user, or processing of information from the visited sysiem such as its overhead message train or authentication signaling peculiar to the visited system protocol) subscriber unit 210 will convert the received RAND into the home system format ($RAND_H$). This conversion may be done, for example, in the microprocessor unit 114 of FIG. 1. Coming from a GSM system into a IS-54/95 type system, such a conversion could be done by concatenating the 32 bit RAND received by the subscriber unit with an alternating high and low bit pattern ("one zero one zero" or "zero one zero one") depending on the parity of the 32 bit challenge, and into a 128 bit RAND expected by the SIU/SIM 216.

Being a typical GSM SIM, SIU 216 in turn calculates a 32 bit SRES and 64 bit Kc. The subscriber unit 210 then reformats the SRES, for example by truncating the 32 bit SRES into an 18 bit AUTH_R and communicating the AUTH_R to the serving switch center communication unit 234. (Steps 325–340).

In the preferred embodiment the switch center 234 next communicates the received AUTH_R, the 32 bit RAND, and subscriber identity (MSI) to the home system 204 via PSTN 250. It is thus assumed that no extra computational requirements are added to the visited system, since the necessary reeonversion will be done by the home system at its service center 235. One skilled in the art will readily appreciate, however, that the necessary protocol conversions could be performed either in the visited system 202 service center 234, or in the home system 204 service center 235. A skilled artisan will also understand how to implement a necessary interworking function, in light of the invention, at either or both of the switching centers 234, 235 such that the signaling information communicated via PSTN 250 can be received and understood at the receiving switching center. Thus, the visited system 202 could implement the necessary conversion/interworking functions such that, should the home system 204 not respond to ordinary signaling and an unconverted AUTH_R/RAND pair, the visited system could do the necessary conversion and forward appropriately formatted information to the switch center 235 in home system 204.

On receipt of the AUTH_R/RAND pair and subscriber identity (MSI), HLR/AuC 243, 245 of home system 204 converts the 32 bit RAND into 128 bit RANDH using the same conversion protocol as applied by SIU 216. SRES and Kc are then calculated using the retrieved Ki and $RAND_H$, and a converted SRES (truncated in this example) is compared with the received AUTH_R. The visited system 202 switch center 234 is then notified whether subscriber unit 210 has been authenticated. If subscriber unit 210 has been authenticated, a Kc is forwarded as a secret session key for encryption purposes. (Steps 345–365).

In order to minimize inter system signaling, it is preferable to generate and send an additional set of challenge response triplets to VLR 242 for use in subsequent authentication. In this case, HLR/AuC 243, 245 will also generate additional sets (typically five) of Kc-$RAND_H$-SRES triplets in keeping with the above embodiment, HLR 243 will further process the $RAND_H$-SRES output into the visited system formatted RAND-AUTH_R pairs.

An alternative approach which would additionally utilize historical information in the authentication process would be that of converting the $RAND_H$ into n RANDs, where n is a number such as six. In other words, the 128 bit $RAND_H$ could be segmented into six 24 bit RAND_U's used for authentication of ongoing communications within a IS-54/ 95-type system. Once converted, the triplets would be forwarded to VLR 242 along with the initial session encryption key (Kc), and communications by subscriber unit 210 would then commence within the visited system 202. The visited system 202 would then communicate a RAND_U upon the occurrence of a challenge event, and subscriber unit 210 would store each of the RAND_Us until all n had been received. The subscriber unit would throw away any bits in excess of 128 from the combined n RAND_U's, and input the $RAND_H$ into the SIU 216. SIU 216 would in turn generate a SRES from the $RAND_H$, and output the SRES for conversion to an AUTH_R for transmission to the visited system 202. In a more flexible approach, the subscriber unit 210 could instead store the RAND_Us in a first-in-first-out register, using a predetermined fill pattern or the like when the register is not yet full to convert the stored bits into a 128 bit RAND, and otherwise using the last-in 128 bits as a RAND having historic information; the HLR would have already calculated an expected SRES taking into account this challenge approach. In either approach, upon appropriate authentication, communications would continue using the new Kc for the encryption variable. (Steps 365–395).

Figure 4:
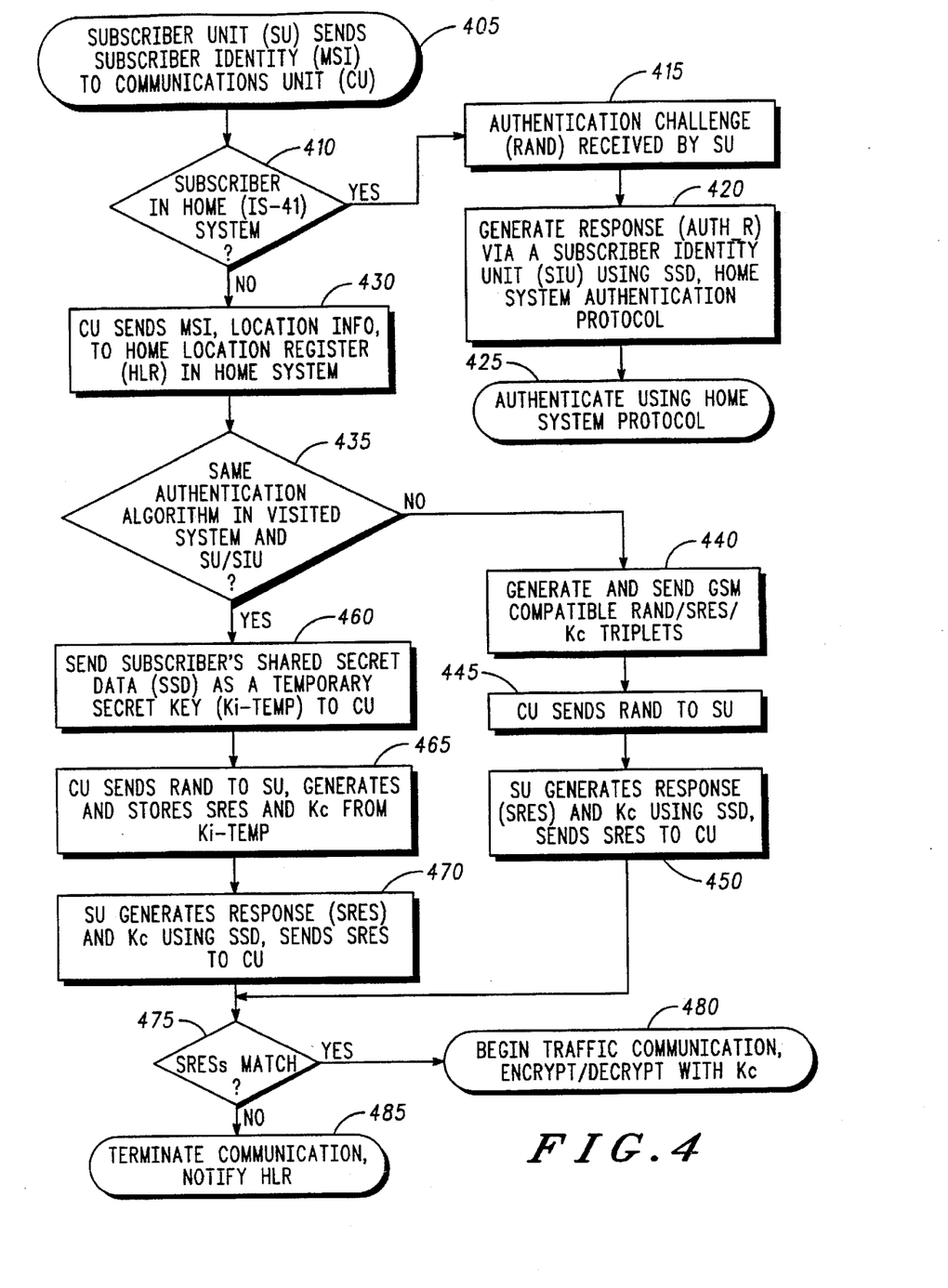
FIG. 4 is a flowchart of an authentication process used in accordance with a second embodiment of the invention.

FIG. 4 next illustrates an alternative embodiment of the invention, with a particular view towards roaming subscribers using dual air interface phones, but for which their home system uses an IS-41/54/95 authentication protocol. As with the embodiment of FIG. 3, should the subscriber unit 210 recognize that it is in its home system, authentication would proceed in accordance with the home system authentication protocol (Steps 315–320; 410–425). If the subscriber unit 210 on the other hand recognized that it was in a GSM system, it would commence by sending the subscriber identifier (MSI) to the serving base station using the appropriate air interface protocols. The fixed network communication unit, for example switch center 235, would then establish a connection via PSTN 250 to the home location register in the home system (which for purposes of discussion in FIG. 4 is considered within switch center 242). In a preferred embodiment, the subscriber profile maintained in the HLR would also note whether subscriber unit 210 or SIU 216 maintained a copy of the algorithm used in the visited system (e.g., the A38) or a special purpose algorithm or extension on the home system algorithm (e.g., for processing non-standard bit-length challenges or responses, without requiring storage of the visited system algorithm. If the same algorithm is used, the home system would then forward the shared secret data (SSD) of 128 bits to the visited system for use as a temporary secret key (Ki-temp). The visited system would generate the necessary RAND-SRES-Kc triplets from the Ki-temp and communicate the first RAND to the subscriber unit 210 for appropriate response. In response the subscriber unit would generate a SRES and Kc using its stored SSD and the A38 algorithm, and send the SRES to the visited system. (Steps 435–470).

Should the subscriber unit/SIU 216 not be equipped with appropriate visited system authentication algorithms, the home system would generate and send GSM compatible RAND-SRES-Kc triplets to the visited system. The visited system would again challenge the subscriber unit and compare the generated SRES from the subscriber unit. (Steps 440–475). Depending upon the received SRES, services is either allowed to commence or terminated. (Steps 475–485).

It should be appreciated that there are many variations upon the methods described in FIGS. 3 and 4, depending upon such factors as the programming of SIU 216 and subscriber unit 210, and the conversion and inter networking capabilities of the respective visited or home system switch centers and location registers. Thus, in the case of the embodiment illustrated in FIG. 4, an even more secure approach could be achieved by requiring the generation of a RAND and forwarding of a signed response to the home system before release of the SSD to the visited system. One skilled in the art will recognize that preferences for such variations may change based upon competing factors such as the desirability for maintaining more security over access to a temporary Ki key, and the liability incurred by the increased inter system signaling traffic and consequent delay forced upon the subscriber during authentication.

Figure 5:
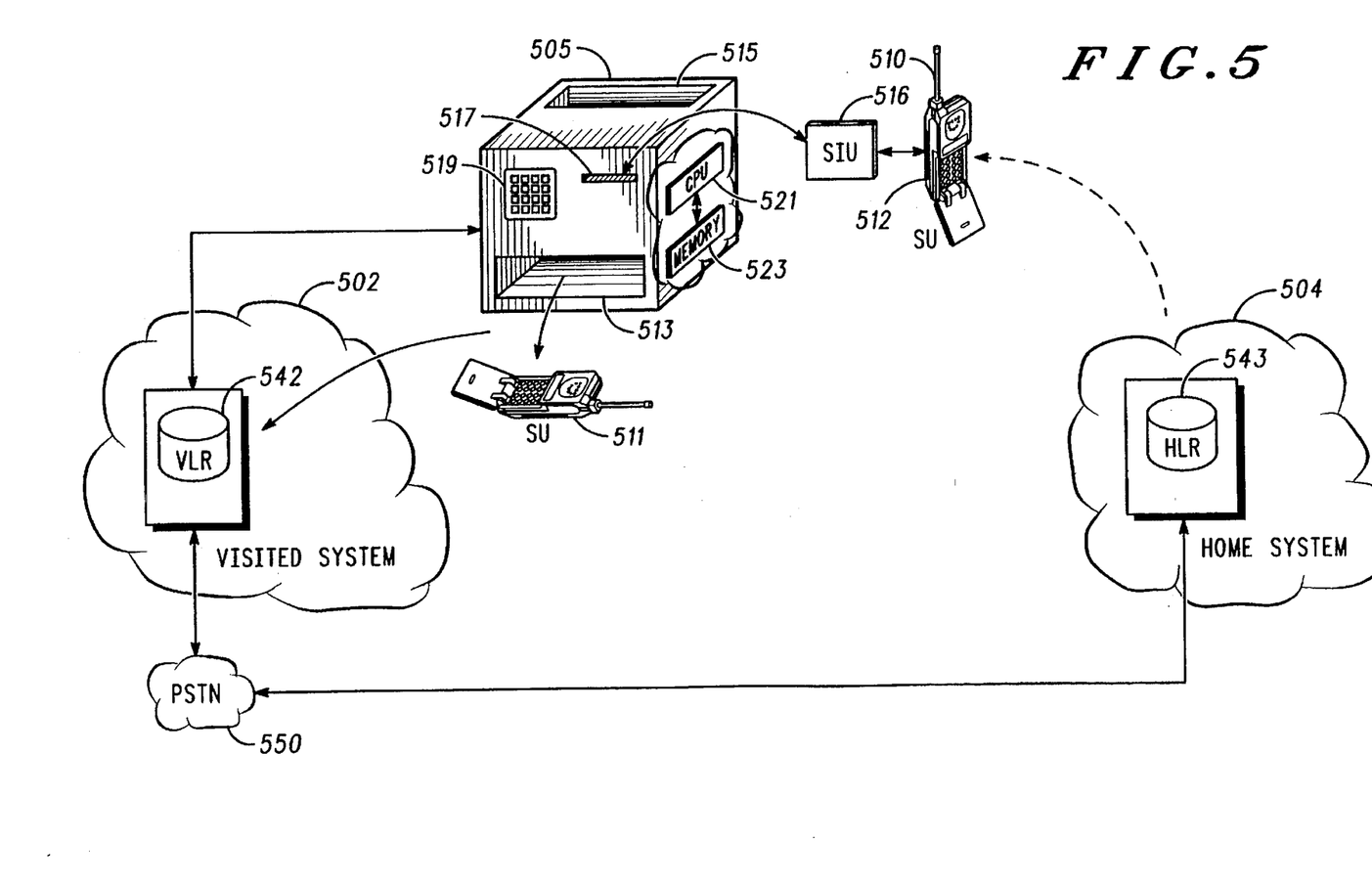
FIG. 5 is a diagram depicting another system providing for roaming in accordance with the invention.

FIG. 5 illustrates yet another embodiment for achieving inter system authentication and a more universal personal mobility for subscribers. In this illustrated embodiment, either of the subscriber unit 510 or a detachable subscriber identity unit (SIU) 516 contain the necessary authentication information for the subscriber, although subscriber unit 510 is not equipped as a dual air interface phone. Where SIU 516 is detachable from a slot 512 in subscriber unit 510, the subscriber may readily roam using the SIU 516 and an appropriately configured temporary subscriber unit 511 obtained for use within a visited system 502.

One particularly advantageous apparatus for achieving this universal mobility would be the use of a temporary subscriber unit terminal 505 (in this example a dispenser box) located at some entry point into the visited system, such as an airport or border crossing. In order to obtain a temporary subscriber unit 511, the subscriber would only need insert his SIU 516 into terminal 505. To provide for more security, a user PIN could be optionally required and entered via data entry interface 519 on the terminal 505. Smart card reader 517 would then obtain subscriber identity information (MSI) and alert the terminal to connect with a visitor location register (VLR) 542 of the local system.

In response the local system would generate a RAND and forward this to terminal 505. Upon determination of the subscriber's home system authentication format, for example from information in the MSI, the local system 502 or terminal 505 would convert the generated RAND into a home system format ($RAND_H$) for input to SIU 516. SIU 516 in turn would generate a signed response (e.g. SRES, but hereinafter more generally "RESP") and encryption key (e.g. Kc) using its secret key (e.g. Ki), and output the Kc and RESP to the terminal 505. Terminal 505 then forwards the MSI, location information (if not already present in the VLR) $RAND_H$ and RESP to the local system switch center or VLR 542, for forwarding to the home system 504 home location register 543.

Figure 7:
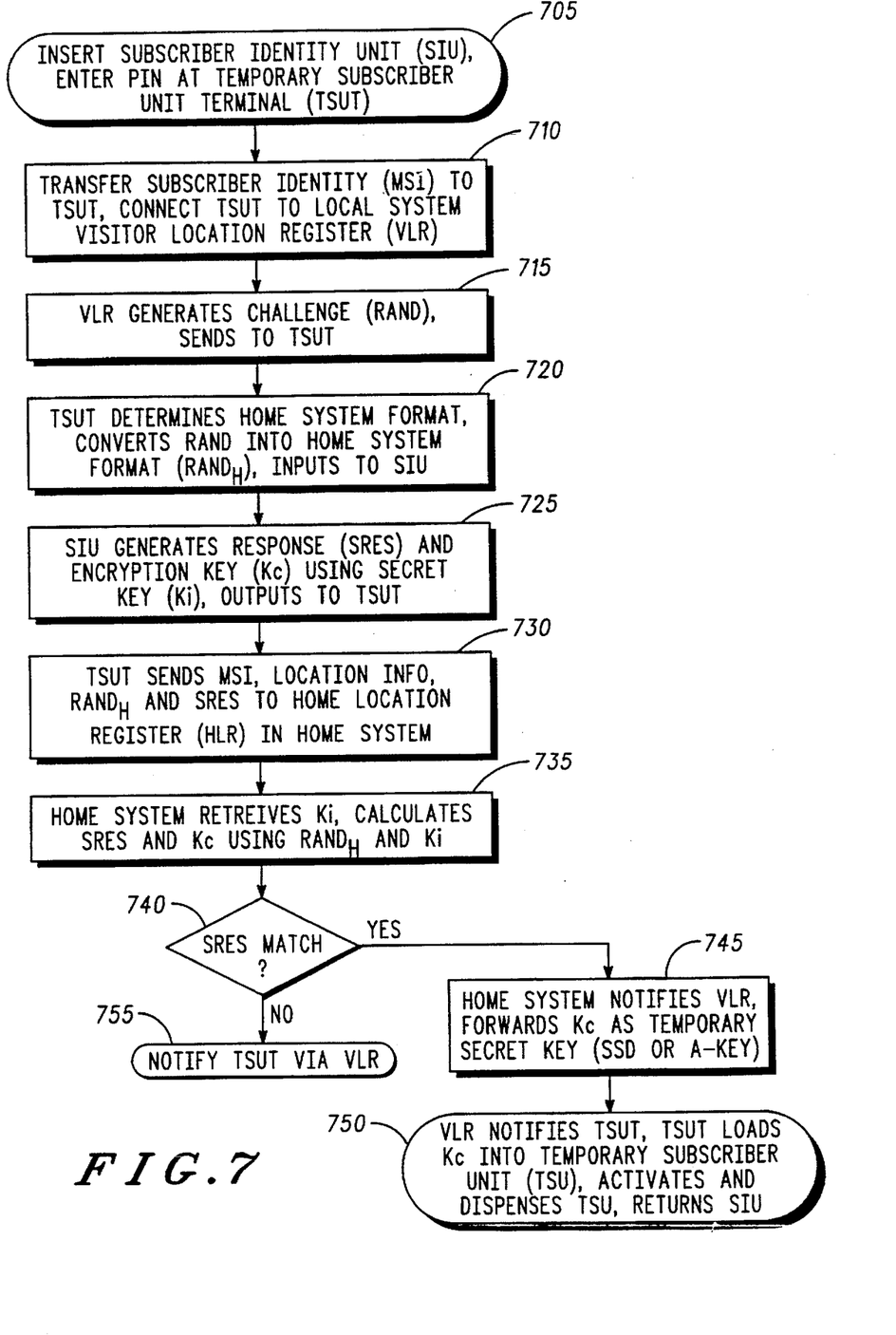
FIG. 7 is a flowchart of an authentication process in accordance with a third embodiment of the invention.

Upon retrieval of Ki, the home system would calculate RESP and Kc using the $RAND_H$ and Ki, and determine whether an authentication match existed. The result would be forwarded to the terminal 505 via PSTN 550 and VLR 542, along with a Kc for use as a temporary secret key (A-key). Upon receipt, terminal 505 would load the temporary A-key into temporary subscriber unit 511 (in its temporary, or volatile, memory) and activate and dispense temporary subscriber unit 511 to the subscriber, and return the SIU 516. (Steps 705–750 of FIG. 7). When done, the subscriber would return temporary subscriber unit 511 via return slot 513 in terminal 505 or a similar terminal.

If the subscriber were roaming with a subscriber unit that did not have a detachable SIU 516, such as is more typical of current USDC-style phones, this same inter system roaming could be achieved by appropriate modification to subscriber unit 510. Sincd subscriber unit 510 would have the necessary secret key information and algorithms for initial authentication, subscriber unit 510 need only be modified to include a data interface 512 such as metal contacts coupled to the MPU. Thus, instead of inserting SIU 516 into an appropriate reader 517, the subscriber unit could be placed into an appropriately configured receiving slot 515 on the terminal 505 and authentication information communicated between terminal 505 and subscriber unit 510 via contacts 512. The receiving slot could also be a rf chamber capable of receiving and communicating with subscriber unit 510 via an antenna and the subscriber unit's home air interface (using appropriately programmed and configured processor and transceiver(s) for all air interfaces to be serviced). Although such approaches are less convenient than one in which each subscriber has an SIU, they nonetheless provide for much greater mobility for the many subscribers having identifier/authentication information retained in a memory within their subscriber units.

While the above embodiment has been described with a view towards one subscriber unit roaming between systems using different authentication protocols, it is also possible to use an implementation like terminal 505 to provide for mobility of subscribers having a subscriber unit 510 compatible with only one air interface and one authentication protocol. Initial authentication could proceed, once contact via interface 512 on subscriber unit 510 is established at terminal 505, via established similar system protocols. In order to allow for greater mobility of the temporary subscriber unit, however, once authentication is initially established the temporary subscriber unit could be programmed via terminal 505 with a temporary A-key, which would act as the user's secret key for the duration of the rental. This temporary A-key could be programmed into the temporary subscriber unit 511 via contacts such as battery contacts, similar to security code programming presently being used. This of course requires an encrypted link between the terminal 505 and home system, due to the sensitivity of even a temporary A-key (alternatively, the temporary A-key could be a Kc from the SIU). A SSD would then be generated utilizing the new temporary A-key, and the rental unit 511 released for use. Assignment of a time variable or other parameter into the temporary subscriber unit 511 would establish a limit for the length of any usage on the temporary subscriber unit 511, thus providing an extra security precaution. The temporary subscriber unit 511 could be further configured so as to provide a warning to the subscriber as the end of the rental period approached.

Alternatively, some operators may find it preferable to have the temporary subscriber unit 511 preprogrammed with a MIN and A-key specific to that temporary subscriber unit 511. In this case, following successful authentication of a roaming subscriber, the terminal would provide the MIN to the home system via the visited system VLR. One of the location registers within the visited system would act as the home location register for the temporary subscriber unit 511, and would have appropriately stored information including the network copy of the A-key. Further authentication and encryption for the temporary subscriber unit 511 would proceed using the A-key and visited system protocols.

In yet another alternative approach, where the temporary subscriber unit 511 is equipped for reading a smart card (or SIM) terminal 505 can be preloaded with cards having known Ki/IMSI combinations. Then, as soon as the subscriber is authenticated, a smart card can be dispensed and its IMSI reported to the local (GSM) system. Further privacy and authentication can proceed according to the local authentication protocol.

Figure 6:
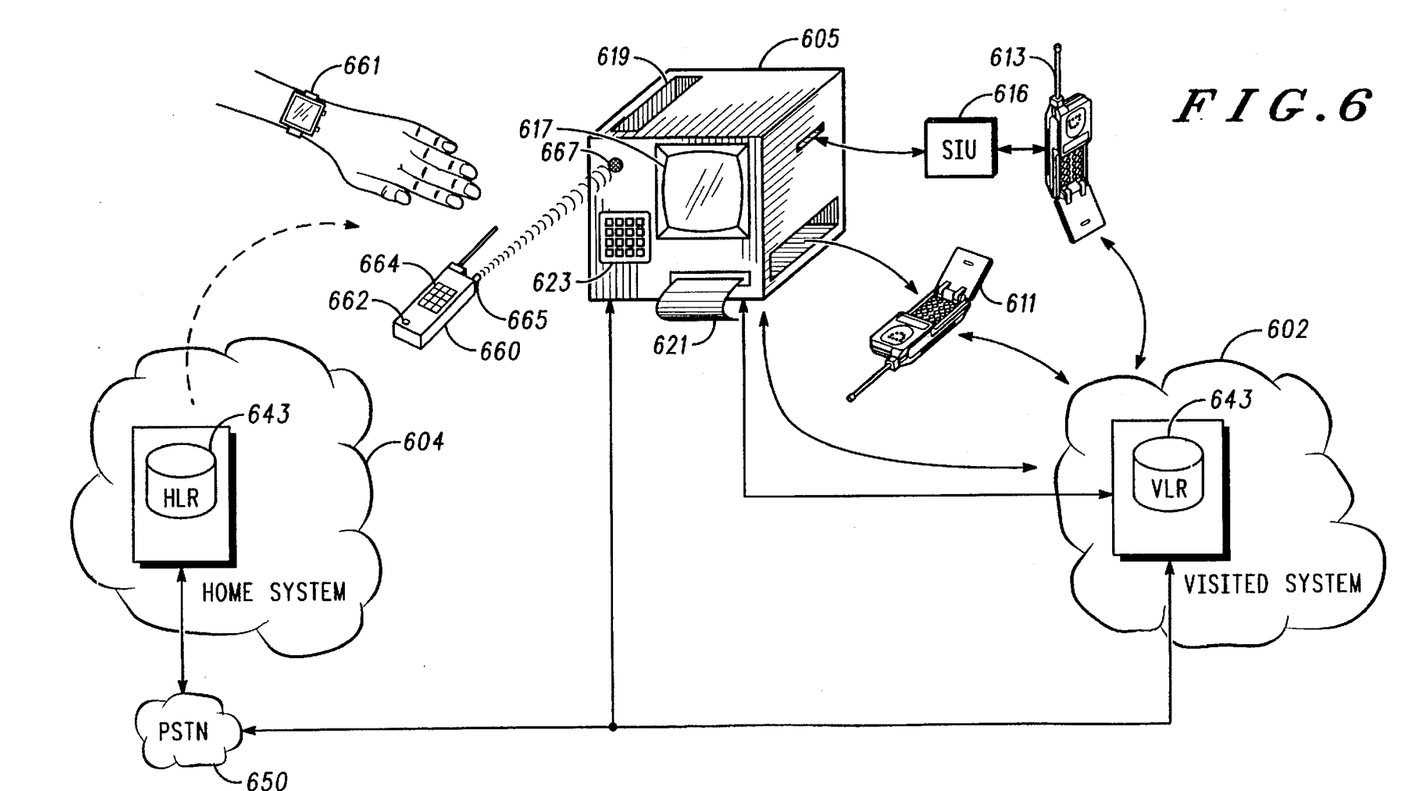
FIG. 6 is a diagram depicting yet another system allowing for roaming in accordance with the invention.

Turning to FIG. 6, yet another embodiment of the invention is illustrated. One method by which authentication can proceed with this embodiment is further illustrated in FIGS. 8 and 9. Unlike the previous embodiments which were focused on terminal mobility, i.e. allowing roaming of a subscriber unit or a temporary subscriber unit across system boundaries, the embodiment of FIG. 6 illustrates a further extension into "user" mobility or roaming across system boundaries and with multiple subscriber units. Rather than relying upon subscriber identity modules (SIMS) or smart cards to access service to one subscriber unit at a time, the apparatus and method of the present invention allow a subscriber (or user) identity unit to authenticate multiple services at a time as desired or needed by the subscriber. Nor does the SIU need to be detachable (and so more susceptible to being misplaced), but may be embedded in any convenient subscriber unit. Two such units are illustrated in FIG. 6, a small "candy bar"-sized phone 660, or even smaller yet watch-sized unit 661. Further advances in miniaturization will permit even smaller and more conveniently sized objects (for example pens and the like) to serve as a primary subscriber unit storing the user's subscriber identity unit.

In this further embodiment the subscriber unit includes a means for establishing a proximity link to a temporary subscriber unit terminal. By "proximity" is meant a limited range (typically less than 10 meters), and thus reasonably private or secure, communication link. This is depicted in FIG. 6 as a short range light-frequency (infrared) link between infrared transceivers 665 and 667 on subscriber unit 660 and terminal 605, respectively. The user can initiate this link manually, such as by depressing button 662, or by any other convenient user interface 664 such as a keypad or microphone (for voice recognition-capable subscriber units). One skilled in the art will further appreciate that the proximity link can be established via any wireless technology (e.g., low power rf, or even laser), and could be further established (for example for more secure transactions or as a backup) by means of electrical connectors suitably adapted on subscriber unit 660 and terminal 605.

Once the proximity link is established, the subscriber unit transfers a subscriber identity (for example either an IMSI or a TMSI, depending upon system preferences and capabilities) and a service request to the terminal 605. Additional parameters can be entered and transmitted via the subscriber unit 660, such as the period for which service is desired. Alternatively, these additional parmeters could be entered directly through a user interface 623 on the terminal 605.

Upon receipt of the service request, a secure connection is established from terminal 605 to the local system's serving location register (VLR 643), and the local system is notified of the MSI, service request, and any additional parameters. In response, the local system 602 generates sufficient challenges (RANDs) for the amount of requested service and forwards the RANDs to the subscriber unit 660 via terminal 605. Terminal 605 is further equipped to recognize the home system and thus the authentication protocol and formatting used by the subscriber identity unit of subscriber 660, and converts the received RANDs into an appropriate home system format (RANDHs). Alternatively, the SIU itself is equipped to recognize and convert challenges and responses received from visited systems 602 into its own home system format. In either case, an appropriately formatted RAND is received by the user identity unit and inputted into an authentication algorithm together with its secret key (e.g., Ki) to generate a response (e.g., $RESP_H$) and encryption key (e.g., Kc) for each $RAND_H$. The resulting triplets are appropriately converted and forwarded to (or alternatively forwarded and subsequently convened into local system protocol ($RESP_V$s) at) terminal 605.

Once the $RESP_V$s are received at VLR 643, the MSI, location, service request and RAND/$RESP_V$ pairs are forwarded to the home system 604 and home location register 643 or other authenticating center for the user identity unit. Upon appropriate conversion of the RAND/RESP pairs into its home system protocol, further $RESP_H$s and the encryption key(s) (Kc) are generated from the $RAND_H$ and stored secret key (Ki). The converted RESPs and further $RESP_H$s are then compared for an authentication match.

Terminal 605 is then notified of the result, and the calculated Kcs are forwarded upon authentication to the terminal 605 via VLR 643. VLR 643 stores the $RAND_V$-$RESP_V$-Kc triplets, and terminal 605 loads the stored triplets into the temporary subscriber unit 611, 613. (See steps 805-885 of FIG. 8).

In addition to providing a temporary subscriber unit 611, 613, or a temporary smart card 616 for use in a temporary subscriber unit 613, terminal 605 itself could be used as a fixed end system or wireless fixed system for user services. For example, terminal 605 could include a video terminal 617 and user input 623 (keyboard, microphone or the like) or even a hard copy output such as a fax machine 621. Where the terminal is connected via wireless means to the local system 602, authentication and initiation of these services would precede as described above in connection with FIG. 8. It is also possible, where the terminal is connected directly to a voice (such as PSTN 650) or data network, to connect terminal 605 directly with home system 604 to receive authentication and obtain the desired communications. In this latter case, a simplified authentication procedure can be used in which the HLR 643 generates the necessary RANDs for the requested services and verifies the subsequent signed responses, all while using a more or less direct connection via the PSTN 650 to terminal 605. Alternatively, terminal 605 can generate the necessary RANDs ahead of time, obtain responses (RESPs), and forward a RAND-RESP pair as service is desired. For example, were an executive to notify a terminal 605 in a meeting room that all faxes should be sent to terminal 605 for a set time, terminal 605 would generate sufficient RANDs (e.g., based on a time parameter communicated by the subscriber executive) to last the set time. The subscriber unit 660 would generate the RESPs, and terminal 605 would communicate the subscriber unit 660 MSI, request for service, and a RAND/RESP pair, via PSTN 650 or VLR 643 if using wireless means, for authentication by the home system 604. Upon authentication, the home system 604 would store an indicator that faxes for the set time period should be forwarded to terminal 605. When a fax is ready to be forwarded, an additional RAND/RESP pair can be used to authenticate terminal 605 prior to actual transmission.

Because the user identity unit may be used to optionally activite several temporary subscriber units or services at a time, it is advantageous for subscriber unit 660 to come equipped with a user interface 664 which includes a display for alerting the user about the number and types of devices that are currently active as subscriber "proxies" or temporary subscriber units. It is also particularly advantageous to include in each of the subscriber units a protocol for turning off or "timing out" the unit at the end of the user's specified service period. A temporary subscriber unit so equipped would prompt the user toward the end of the service period about the need to reestablish a proximity link and obtain authorization for further service/additional triplets. Upon the end of such period without appropriate further authentication, the temporary subscriber unit would be equipped to delete any temporary identifier (TMSI) and triplets loaded into the temporary subscriber unit, and the user would be prompted to return the temporary subscriber unit to a terminal for further service. The temporary subscriber unit would also be equipped to delete any user specific information before the end of the service period specified in response to a user deactivation. (See steps 905-925 of FIG. 9).

Because the user has not relinquished his security credentials resident on the user identity unit, special services may be originated/delivered to any one of a number of target subscriber units appropriately authenticated by the user, and the user's own phone 660 may still simultaneously be used for originating and receiving ordinary voice calls if compatible with the local system air interface and network. The user interface 664 reminder feature serves to alert the user as to how many devices (and types) are currently under proxy rendering temporary services (for example, a "service" icon could show that a video conferencing terminal, a fax machine, and the subscriber unit 660 itself were active for services). This may beneficially prompt the user to terminate services no longer being used. Further, if a predetermined amount of service is requested (such as the setting of a time period or billing amount) an additional safeguard is provided in limiting the amount of service which can be misdirected if, for example, the user were to leave an activated fax machine unattended.

The invention has been described with reference to several illustrative embodiments. As the above description will make apparent to one skilled in the art, however, there are various modifications and further embodiments that can be made without departing from the spirit and scope of the invention. Thus, for example, under appropriately configured systems the particular authentication methods described in connection with FIGS. 3 and 4 can also be used in connection with the embodiment of FIG. 6, both for service provided to subscriber unit 660 (if appropriately configured for the local air interface) and for the terminal 605. A skilled artisan will appreciate that modifications may be employed in the specific interworking of authentication functions depending upon the particular protocols and interfaces being used in systems between which user roaming is to be implemented. Further, while the illustrative embodiments were described in connection with cellular or PCS services, it should be understood that the invention has application to all communication systems requiring authentication, including satellite based, paging and other wireless data, cable and other fixed end terminals communicating via wire or fiber optic channels. Finally, while the above description illustrated the invention by discussion of authentication for one subscriber, it should be understood that the invention has application to, and indeed expects, plural systems to be concurrently processing numerous subscriber authentication requests. Thus, this invention is not to be limited to the specific embodiments discussed and illustrated herein, but rather by the following claims.

We claim:

1. A method of authenticating a subscriber unit in a wireless communication system comprsing the steps of:

receiving a request for authentication of the subscriber unit from a first communication system;

determining that the first communication system uses a first system authentication protocol different from a second system authentication protocol used in the subscriber unit; and generating authentication information in the first system authentication protocol by generating a challenge and a response and by converting the challenge and response from the second system authentication protocol into a challenge and response in the first system authentication protocol.

2. A method of generating authentication information for use in autheticating a subscriber unit of a wireless communication system, the method comprising the steps of:

receiving a request for service from the subscriber unit;

generating a first authentication challenge based on a first authentication protocol; and converting the first authentication challenge into a second authentication challenge in a second authentication protocol.

3. The method of claim 2, further comprising generating a first response based on the first authentication challenge.

4. The method of claim 3, further comprising converting the first response into a second response in the second protocol.

5. The method of claim 4, further comprising sending the second authentication challenge and the second response to the subscriber unit.

6. The method of claim 2, wherein the first authentication protocol is used in a first communication system and the second authentication protocol is used in a second communication system.

* * * * *